US012658374B2

(12) United States Patent
Van Der Wiel et al.

(10) Patent No.: US 12,658,374 B2
(45) Date of Patent: Jun. 16, 2026

(54) TRENCH CAPACITOR WITH REDUCED MECHANICAL STRESS

(71) Applicant: Melexis Technologies NV, Tessenderlo (BE)

(72) Inventors: Appo Van Der Wiel, Tessenderlo (BE); Thomas Freitag, Erfurt (DE)

(73) Assignee: Melexis Technologies NV, Tessenderlo (BE)

( * ) Notice: Subject to any disclaimer, the term of this patent is extended or adjusted under 35 U.S.C. 154(b) by 343 days.

(21) Appl. No.: 18/310,202

(22) Filed: May 1, 2023

(65) Prior Publication Data

US 2023/0386753 A1 Nov. 30, 2023

(30) Foreign Application Priority Data

May 27, 2022 (EP) ..................................... 22175742

(51) Int. Cl.
| | |
|---|---|
| *H01G 4/38* | (2006.01) |
| *H01G 4/01* | (2006.01) |
| *H01G 4/012* | (2006.01) |
| *H01G 4/33* | (2006.01) |

(52) U.S. Cl.
CPC .............. *H01G 4/385* (2013.01); *H01G 4/33* (2013.01); *H01G 4/01* (2013.01); *H01G 4/012* (2013.01)

(58) Field of Classification Search
CPC ............ H01G 4/385; H01G 4/33; H01G 4/01; H01G 4/012; H10D 1/716; H10D 84/212; H10D 84/811; H10D 1/692; H01L 23/642; H01L 23/5223
See application file for complete search history.

(56) References Cited

U.S. PATENT DOCUMENTS

| | | | | | |
|---|---|---|---|---|---|
| 8,492,260 | B2 * | 7/2013 | Parsey, Jr. | ................ | H10D 1/20 257/E21.586 |
| 2010/0032801 | A1 * | 2/2010 | Jacobs | ................... | H10D 1/716 257/532 |
| 2010/0055507 | A1 * | 3/2010 | Morand | .................. | B81B 3/007 428/156 |
| 2012/0080772 | A1 * | 4/2012 | Asami | ................... | H10D 1/716 257/532 |

(Continued)

FOREIGN PATENT DOCUMENTS

| | | |
|---|---|---|
| EP | 3588560 A1 | 1/2020 |

OTHER PUBLICATIONS

Extended European Search Report from Corresponding EP Patent Application No. EP22175742.0, Jan. 5, 2023.

*Primary Examiner* — Timothy J. Dole
*Assistant Examiner* — Daniel M Dubuisson
(74) *Attorney, Agent, or Firm* — Workman Nydegger

(57) ABSTRACT

A trench capacitor includes a plurality of unit trench capacitors arranged in a 2D repetitive pattern in a substrate. The unit trench capacitors are separated by elongated trenches or elongated walls between the unit trench capacitors. The trench capacitor includes a plurality of stress compensation elements. Each unit trench capacitor has one or more closed trenches, with each trench further having a bottom electrode, a top electrode, and a dielectric between the bottom electrode and the top electrode. The unit trench capacitors are connected in parallel and the stress compensation elements are arranged between the unit trench capacitors such that they interrupt the elongated walls or trenches.

13 Claims, 8 Drawing Sheets

(56) References Cited

U.S. PATENT DOCUMENTS

| | | | |
|---|---|---|---|
| 2013/0161792 A1* | 6/2013 | Tran ........................ | H10D 1/62 |
| | | | 438/386 |
| 2017/0084705 A1* | 3/2017 | Grivna ................ | H10D 62/126 |
| 2017/0104057 A1 | 4/2017 | Voiron | |
| 2018/0005961 A1* | 1/2018 | Kaltalioglu ....... | H01L 21/76283 |
| 2018/0315550 A1* | 11/2018 | Ryou .................... | H05K 1/181 |
| 2019/0035880 A1* | 1/2019 | Voiron .................. | H10D 1/716 |
| 2019/0378893 A1* | 12/2019 | Ashimine ............. | H10D 1/043 |
| 2020/0135939 A1 | 4/2020 | Shibata | |
| 2021/0013303 A1* | 1/2021 | Chen ...................... | H01L 24/08 |
| 2021/0090814 A1* | 3/2021 | Sano ..................... | H10D 1/716 |
| 2021/0327867 A1* | 10/2021 | Bouvier ............. | H01L 23/5223 |
| 2022/0130949 A1* | 4/2022 | Huang ................. | H10D 1/716 |
| 2022/0238636 A1* | 7/2022 | Chu ....................... | H10D 1/047 |
| 2022/0367734 A1* | 11/2022 | Kuo ................ | H01L 21/76877 |
| 2023/0102250 A1* | 3/2023 | Fukae ................... | H01G 4/232 |
| | | | 361/303 |

* cited by examiner

TRENCH CAPACITOR WITH REDUCED MECHANICAL STRESS

FIELD OF THE INVENTION

The invention relates to the field of capacitors formed in a substrate. More specifically it relates to capacitors formed in trenches in the substrate in order to increase the surface area of the capacitors.

BACKGROUND OF THE INVENTION

In order to increase the surface of a capacitor trenches are formed in the substrate. The substrate may for example be a silicon substrate and the trench walls may be covered with a dielectric. Wafer bow is caused by stress at the interface of the dielectric with the silicon base and is proportional to the area of this interface. Increasing the area of capacitance with trenches will therefore increase the wafer bow. The induced stress increases with increase depth of the trenches.

The left of FIG. 1 shows a structure with a silicon base 11 covered with the dielectric layer 12. As the dielectric extends over the wafer in a uniform way the stress in y direction 14 is basically the same as the stress in x direction 15. As a result the structure will bend as much in the x direction as in y direction.

The middle of FIG. 1 shows a structure with a silicon base 11 in which trenches 17 are etched in the y direction. Covering this silicon base 11 with the dielectric 12 results then in silicon walls 16 that are covered at the sides with the dielectric 12. Now the stress built up in x direction 15 is less than for the stress in the left structure as the surface is interrupted by trenches. However, the stress built up in y direction 14 is larger than for the left structure as the stress is not only built up at the top of the walls 16 and the bottom of the trenches, but also at the sidewalls of the trenches 17. As a result the middle structure in FIG. 1 will bend much more in the y direction than in x direction.

The right of FIG. 1 shows a structure with a round silicon wall 16 covered with a dielectric that creates stress on the walls. The stress that is built up along the wall will now result in a bending force 13 on the walls. The stress that is absorbed by the bending of the walls will not contribute to the bow of the structure. In fact, the deeper the trenches, or the higher the walls, the more the stress of the dielectric on the trench walls will be absorbed by bending of the walls. As a result the base of the right structure will bend much less than the middle structure in the direction of the trenches as for the right structure the walls can bend perpendicular to the direction of the trenches to absorb the stress on the walls.

A unit cell with concentric trenches will therefore show less substrate bending than a unit cell with parallel trenches or holes as the stress of the dielectric on the trenches will result in a deflection of the walls between the trenches and the deflection will absorb the stress caused by the dielectric on the walls with a flatter overall structure.

Reduction of the stress in the substrate results in a reduced bending of the substrate and may also result in less stress induced faults. Even though creating unit cells with closed trenches already results in a reduced stress in the substrate, there is still a need for a trench capacitor, comprising a plurality of unit trench capacitors, which is designed such that the stress in the substrate can be reduced even more.

SUMMARY OF THE INVENTION

It is an object of embodiments of the present invention to provide a good trench capacitor comprising a plurality of unit trench capacitors.

The above objective is accomplished by a method and device according to the present invention.

In a first aspect embodiments of the present invention relate to a trench capacitor comprising a plurality of unit trench capacitors arranged in a 2D repetitive pattern in a substrate such that the unit trench capacitors are separated by elongated trenches or elongated walls between the unit trench capacitors. The trench capacitor is, furthermore, comprising a plurality of stress compensation elements. Each unit trench capacitor comprises one or more closed trenches, each trench further comprising a bottom electrode, a top electrode, and a dielectric between the bottom electrode and the top electrode. The unit trench capacitors are connected in parallel, and the stress compensation elements are arranged between the unit trench capacitors such that they interrupt the elongated walls or trenches.

It is an advantage of embodiments of the present invention that a trench capacitor with a high capacitance can be obtained. This is achieved by arranging a plurality of unit trench capacitors in a 2D repetitive pattern and by connecting them in parallel. In embodiments of the present invention the bottom electrode is shared between the unit trench capacitors and the top electrode is shared between the unit trench capacitors. In such embodiments the unit trench capacitors are connected in parallel by sharing the electrodes. In some embodiments the bottom electrode of the unit trench capacitors is in a shared use also as a bottom electrode of the stress compensation elements and the top electrode of the unit trench capacitors is in a shared use also as a top electrode of the stress compensation elements.

It is an advantage of embodiments of the present invention that unit cells with closed trenches show less substrate bending than a unit cell with parallel trenches or holes as the stress of the dielectric on the trenches will result in a deflection of the walls between the trenches and the deflection will absorb the stress caused by the dielectric on the walls with a flatter overall structure. It is, moreover, an advantage of embodiments of the present invention that stress created on the elongated trenches or walls between the unit trench capacitors is avoided by providing the stress compensation elements which interrupt the elongated walls or trenches.

In embodiments of the present invention each stress compensation element is a trench capacitor connected in parallel with the unit trench capacitors.

It is an advantage of embodiments of the present invention that the overall capacitance of the trench capacitor is increased even more when the stress compensation elements are capacitors connected in parallel with the unit trench capacitors.

In embodiments of the present invention the stress compensation element is a trench capacitor comprising a closed trench.

In embodiments of the present invention the stress compensation elements are arranged on the crossing of elongated walls or elongated trenches.

In embodiments of the present invention the unit trench capacitors are separated by elongated walls, and the stress compensation elements are trench capacitors connected in parallel with the unit trench capacitors. In embodiments of the present invention the trenches of the stress compensation elements are substantially in the middle of the elongated walls.

In embodiments of the present invention at least some of the unit trench capacitors comprise two or more closed trenches which are arranged concentrically.

It is an advantage of embodiments of the present invention that the capacitance of a unit trench capacitor can be increased by adding concentric trenches and that this can be done without significantly increasing substrate bending.

In embodiments of the present invention the one or more closed trenches of the unit trench capacitors have rounded corners. The rounded corners may have a same radius.

In embodiments of the present invention the unit trench capacitors comprise at least two closed trenches which are similar.

Similar trenches have the same shape but different size. Adjacent trenches of the same unit trench capacitor will in that case be parallel with each other.

In embodiments of the present invention a depth of the one or more trenches of the unit trench capacitors and/or of the stress compensation elements is between 5 and 100 μm.

In embodiments of the present invention a width of the one or more trenches of the unit trench capacitors and/or of the stress compensation elements is between 1 and 10 μm.

In embodiments of the present invention the unit trench capacitors are comprising at least two trenches, wherein a pitch between neighboring trenches is between 2 and 20 μm.

In embodiments of the present invention the closed trenches of the unit trench capacitors have a square or rectangle or rhomboid, or hexagonal, or circular, or ellipsoidal shape.

In a second aspect embodiments of the present invention relate to an RC-snubber device to suppress transients in an electrical system. The RC-snubber device comprises a resistor connected in series with a trench capacitor in accordance with embodiments of the present invention.

In a third aspect embodiments of the present invention relate to a method for making a trench capacitor. The method comprises:

providing a substrate,
  making a plurality of unit trench capacitors, wherein each unit trench capacitor comprises one or more closed trenches, each trench further comprising a bottom electrode, a top electrode, and a dielectric between the bottom electrode and the top electrode, and wherein the unit trench capacitors are arranged in a 2D repetitive pattern in the substrate such that the unit trench capacitors are separated by elongated trenches or elongated walls between the unit trench capacitors, and making stress compensation elements between the unit trench capacitors such that they interrupt the elongated walls or trenches,
  connecting the unit trench capacitors in parallel. The latter may be achieved by sharing the top electrode between the different unit trench capacitors and by sharing the bottom electrode between the different unit trench capacitors.

It is advantageous that by connecting the unit trench capacitors in parallel also the resistance towards the top electrode is lowered. Thereby the response time (determined by RC), in particular in the middle of the unit trench capacitors, is made faster.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
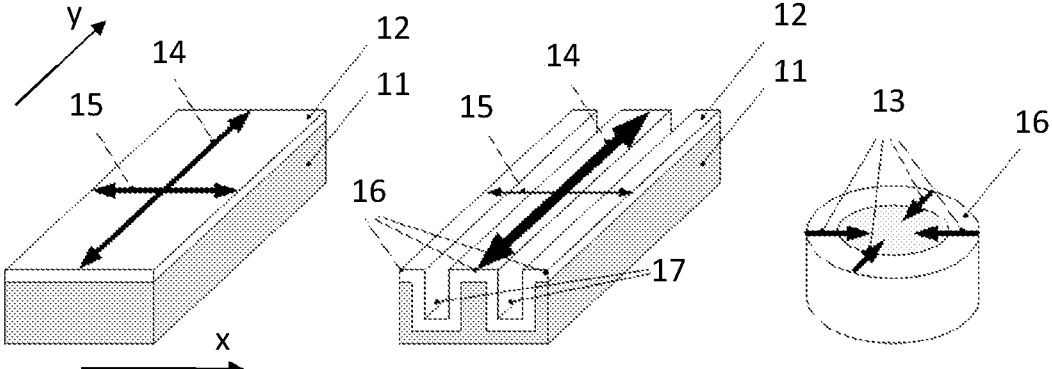
FIG. 1 shows 3D-drawings of a layered substrate illustrating forces caused by the layering.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

As discussed in the introduction stress may exist in a substrate comprising a plurality of unit trench capacitors, and this even when the unit trench capacitors have closed trenches.

Figure 2:
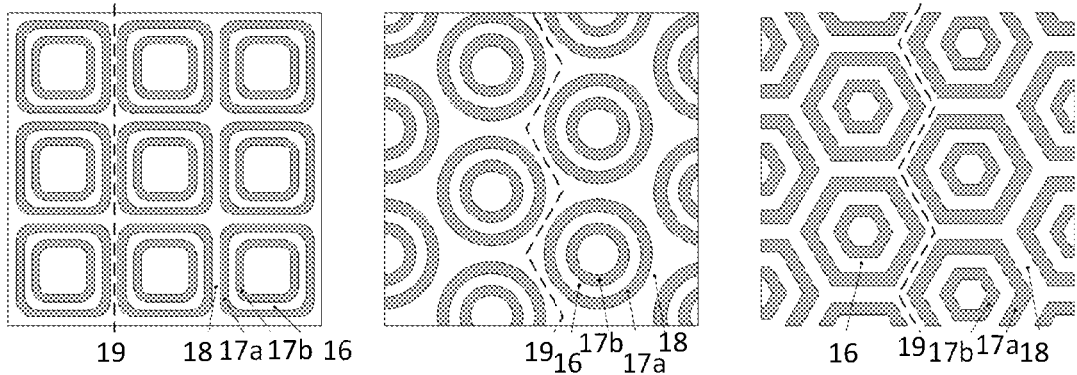
FIG. 2 shows schematic drawings of a plurality of unit trench capacitors organized on a substrate.
Figure 3:
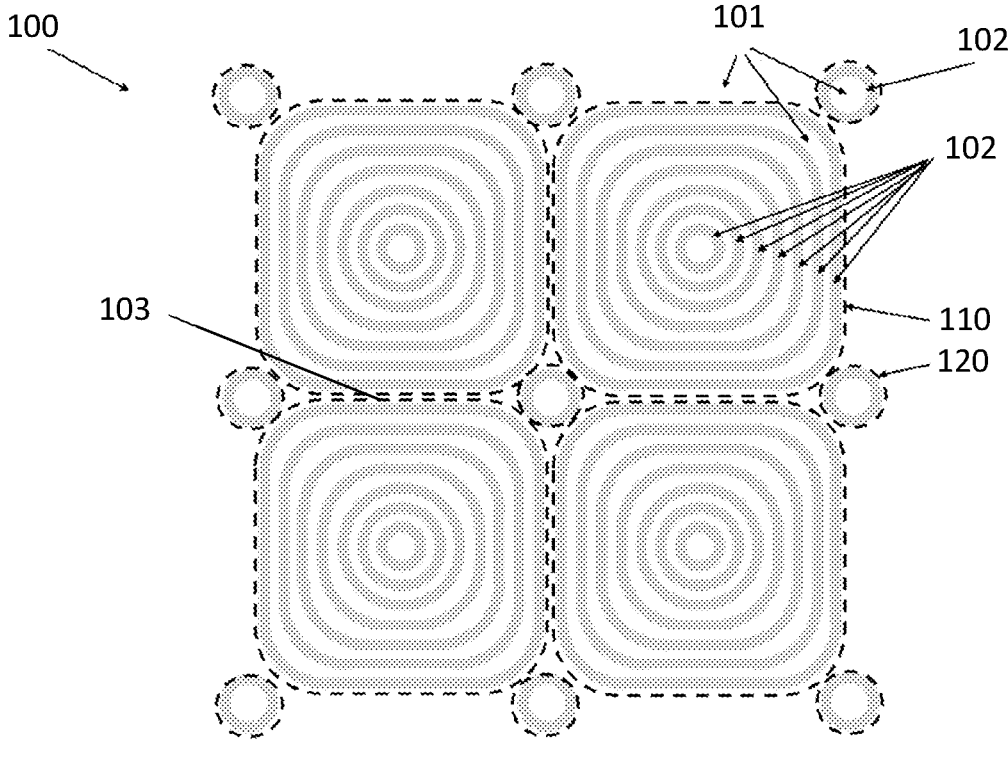
FIG. 3 shows a 2D-schematic drawing of a trench capacitor comprising a plurality of substantially square unit trench capacitors in accordance with embodiments of the present invention.
Figure 4:
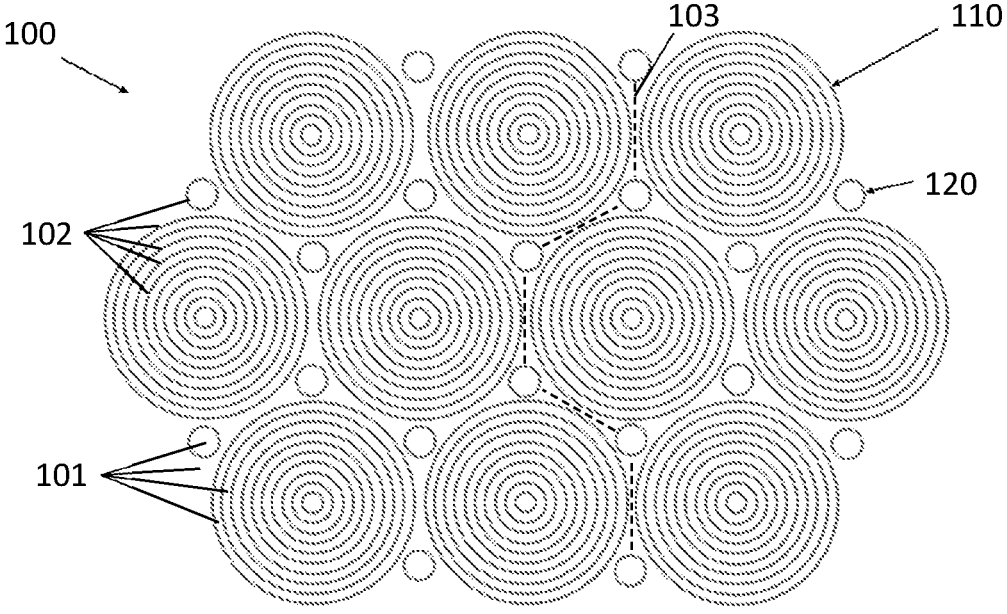
FIG. 4 shows a 2D-schematic drawing of a trench capacitor comprising a plurality of substantially circular unit trench capacitors in accordance with embodiments of the present invention.

FIG. 2 shows different combinations of cells with concentric trenches. For simplicity only the outer concentric wall of a unit cell is drawn. Typically many more walls are formed by trenches in the middle of the cell as is depicted in FIG. 3 and FIG. 4.

The left of FIG. 2 shows an array of substantially square unit cells wherein within each cell a wall 16 is formed by an outer trench 17*a* and a second adjacent inner trench 17*b* of the unit cell. The outer trenches 17*a* of adjacent unit cells form walls 18 between the unit cells. As explained in the introduction, the stress on the walls 18 between the unit cells will not result in a bending of these walls. The deeper the trenches, the more stress will be created. In this example a bow is created in the substrate by the presence of walls 18 between unit cells which extend across the entire array. The dashed line 19 illustrates that the walls 18 between unit cells run across the entire array of unit cells and therefore will cause a large bow.

The middle of FIG. 2 shows an array of basically round unit cells within each cell a wall 16 formed by the outer trench 17*a* and second adjacent inner trench 17*b* of the unit cell. The outer trenches 17*a* of adjacent unit cells form walls 18 between the unit cells. The stress on the walls 18 between the unit cells will not result in a bending of these walls. The deeper the trenches, the more stress will be created. In this example a bow is created in the substrate by the presence of walls 18 between unit cells which extend across the entire array. The line 19 illustrates how the walls 18 between unit cells run across the entire array and therefore will cause a large bow.

The right schematic drawing of FIG. 2 shows an array of hexagonal unit trench capacitors. In this example the walls 18 run across the whole array along paths such as the path indicated by the dashed line 19 and therefore will cause a large bow.

In a first aspect embodiments of the present invention relate to a trench capacitor 100 comprising a plurality of unit trench capacitors 110 arranged in a 2D repetitive pattern. Different embodiments of such a trench capacitor are illustrated in schematic 2D-drawings of FIGS. 3 to 7. The reference numbers in these figures correspond with the reference numbers of the description. The unit trench capacitors 110 are provided in a substrate 101. In embodiments of the present invention the unit trench capacitors 110 are separated by elongated trenches or elongated walls between the unit trench capacitors 110. The trench capacitor is, furthermore, comprising a plurality of stress compensation elements 120 which are arranged between the unit trench capacitors 110 such that they interrupt the elongated walls 103 or trenches.

Each unit trench capacitor 110 comprises one or more closed trenches, each trench further comprising a bottom electrode 111, a top electrode 113, and a dielectric 112 between the bottom electrode 111 and the top electrode 113. In embodiments of the present invention the unit trench capacitors are connected in parallel.

It is an advantage of embodiments of the present invention that stress on the walls between unit trench capacitors is not built up over the entire array. It is an advantage of embodiments of the present invention that thereby wafer bow can be reduced or even prevented. In embodiments of the present invention the wafer bow for a 6 inch wafer may for example be limited to +/−50 μm and the bow for an 8 inch wafer to +/−150 μm.

In embodiments of the present invention at least some or all of the unit trench capacitors comprise two or more closed trenches which are arranged concentrically. By doing so the overall capacitance of the trench capacitor can be increased even more. This can, moreover, be done without significantly increasing substrate bending.

In embodiments of the present invention each stress compensation element 120 is a trench capacitor connected in parallel with the unit trench capacitors 110.

It is an advantage of embodiments of the present invention that the trenches on the wafer are defined in such a way that stress between the dielectric and the sidewalls of the trenches in the substrate does not contribute to the wafer bow.

In embodiments of the present invention the stress compensation elements are arranged on the crossing of elongated walls of elongated trenches.

FIG. 3 shows a 2D-schematic drawing of a trench capacitor 100 comprising a plurality of unit trench capacitors 110 in accordance with embodiments of the present invention. Each unit trench capacitor 110 comprises a plurality of substantially square trenches with rounded corners. Capacitive stress compensation elements are present between the corners of adjacent unit trench capacitors 110.

FIG. 4 also shows a 2D-schematic drawing of a trench capacitor 100 in accordance with embodiments of the present invention. The difference with FIG. 3 being that in FIG. 4 the unit trench capacitors comprise circular trenches. In this example the unit trench capacitors are organized in a hexagonal packing and the stress compensation elements 120 are present in the openings between the unit trench capacitors 110.

In FIG. 3 as well as in FIG. 4 the unit trench capacitors 110 as well as the stress compensation elements 120 further comprise trenches 102 etched in a substrate 101. The dashed lines in FIG. 3 and FIG. 4 illustrate how an elongated wall is formed between the unit trench capacitors 110 and how this elongated wall is interrupted by the unit trench capacitors 120. These unit trench capacitors 120 are arranged on the crossing of the elongated walls. The center of a stress compensation element is at the crossing of two elongated walls.

In embodiments of the present invention with closed (e.g. circular) trenches the depth of the trenche(s) of the capacitors is at least 3 times deeper than the thickness of the wall in order to assure that the walls bend perpendicular to the direction of the trenches to avoid bending of the wafer.

Where in embodiments of the present invention reference is made to the middle of an elongated wall reference is made to the middle between the outer trenches of two neighboring unit trench capacitors. In embodiments of the present invention the trenches of the stress compensation elements are substantially in the middle of the elongated walls. Examples thereof are given in the embodiments illustrated in FIGS. 5, 6 and 7.

Figure 5:
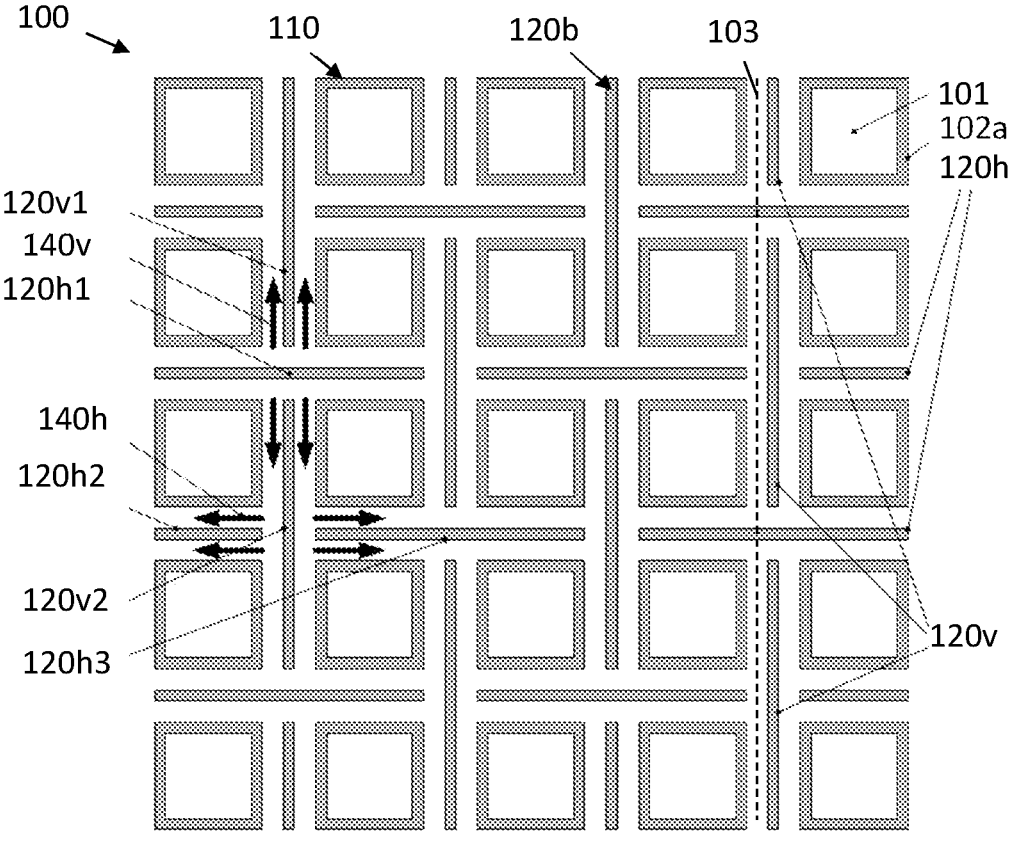
FIG. 5 and FIG. 6 shows a 2D-schematic drawing of a trench capacitor comprising a plurality of substantially square unit trench capacitors in accordance with embodiments of the present invention.

FIG. 5 discloses another trench capacitor 100, in accordance with embodiments of the present invention, wherein the unit trench capacitors are made of square trenches. In case a unit trench capacitor comprises a plurality of trenches, these are preferentially concentric. By increasing the number of trenches per unit trench capacitor the capacitance of the unit trench capacitor can be increased. In the embodiment illustrated in FIG. 5 the elongated walls between adjacent unit trench capacitors formed by outer trenches 102a of the unit cells are split in two with stress compensation elements 120h, 120v. These trenches break the stress built up by outer unit cell walls that end in the middle of these trenches. Moreover, horizontal trench 120h1 breaks the stress 140v that is built up along the outer walls of the vertical trenches 120v1 and 120v2. Likewise the vertical trench 120v2 breaks the stress 140h that is built up along the outer walls of the horizontal trenches 120h2 and 120h3. Hence, the trenches 120 are stress compensation elements between unit cells which prevent wafer bow.

Figure 6:
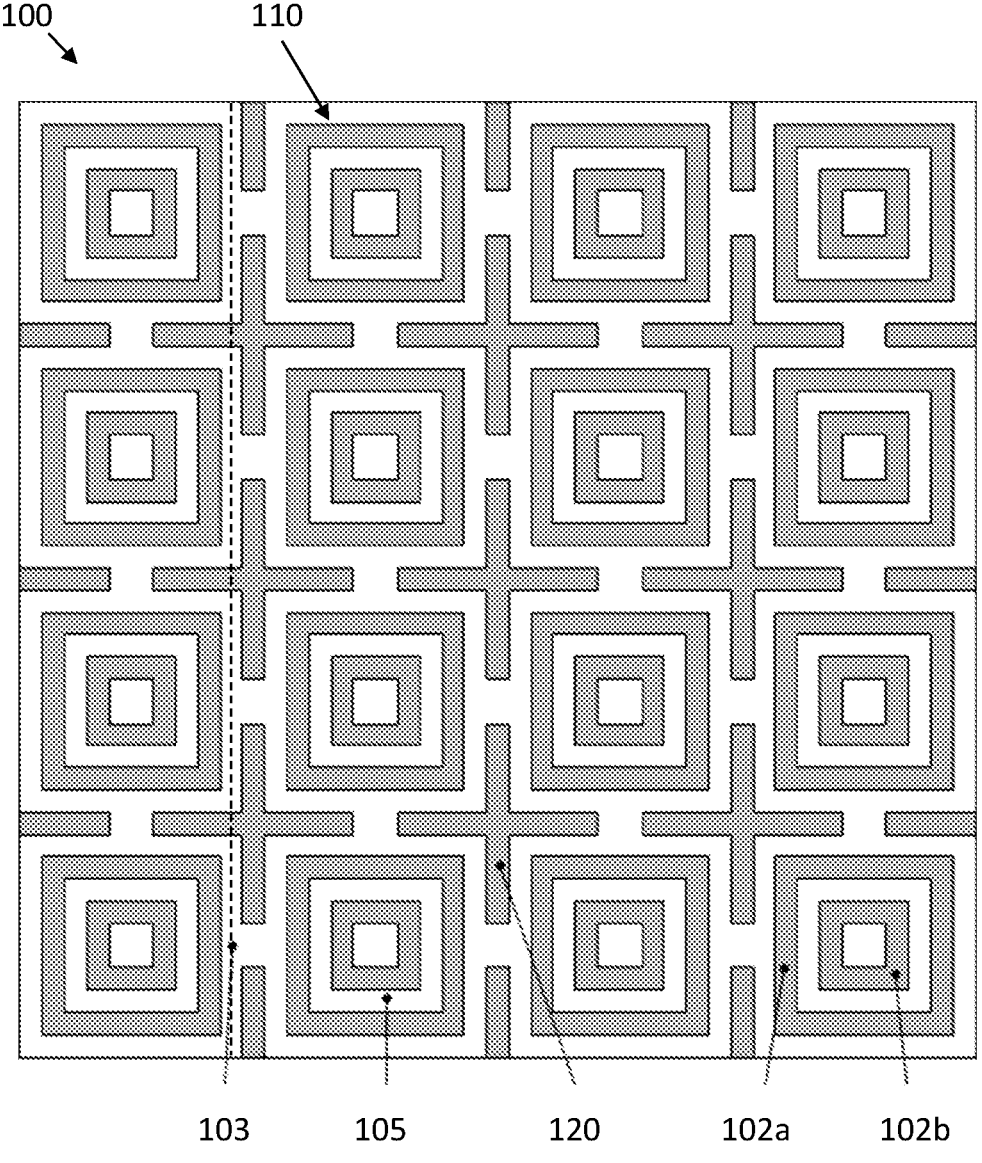

Also in FIG. 6 the trenches 102 of the unit trench capacitors 110 have a square shape. In FIG. 6 the stress compensation elements 120 running vertically and horizontally have been combined to a cross shape. The stress compensation elements are interrupting the elongated walls between the unit trench capacitors (one of these walls is indicated with reference number 103). The trenches of the stress compensation elements do not extend between stress compensation elements, instead the cross shape is interrupted in order to allow also an interruption of the stress as previously discussed. In FIG. 6 the trenches 102a and 102b are coaxial rectangular trenches. A wall 105 is present between the trenches.

Figure 7:
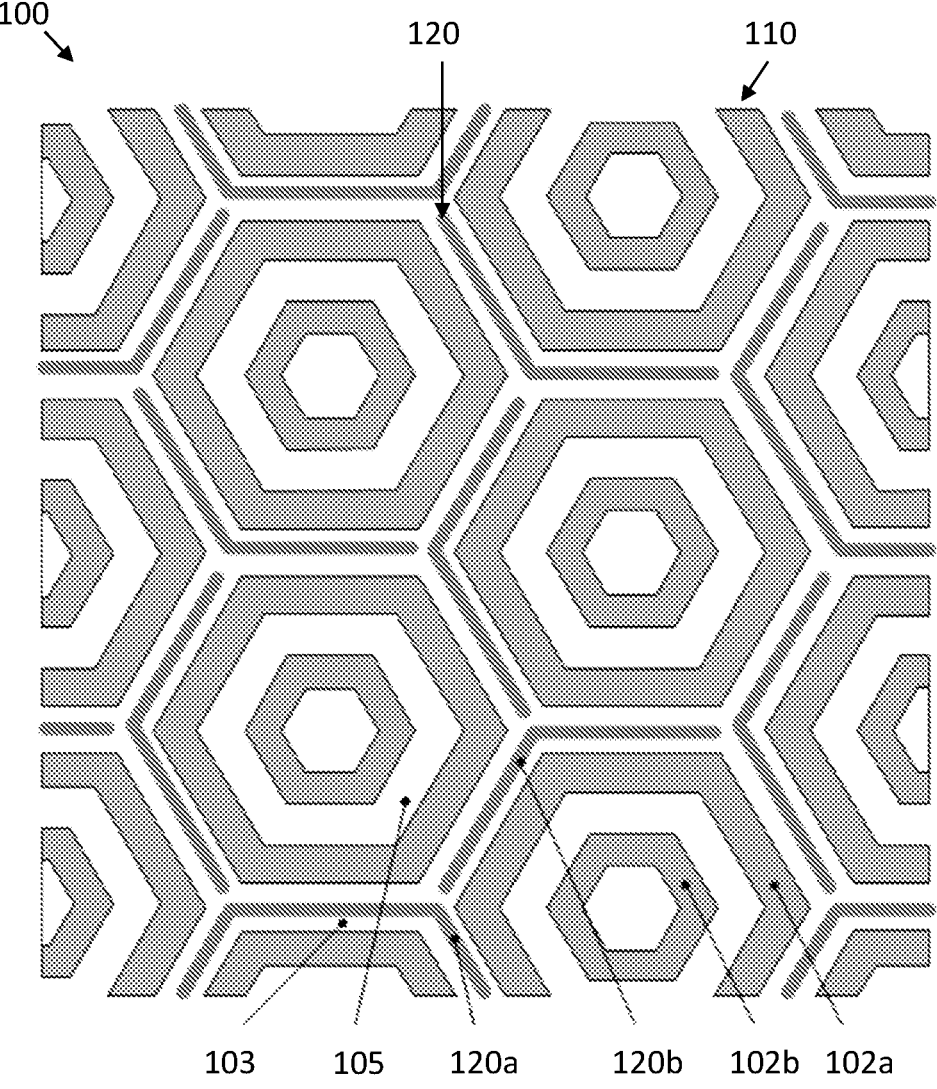
FIG. 7 shows a 2D-schematic drawing of a trench capacitor comprising a plurality of substantially hexagonal unit trench capacitors in accordance with embodiments of the present invention.

In FIG. 7 the trenches 102 of the unit trench capacitors 110 have a hexagonal shape. The trenches 102a and 102b are coaxial hexagonal trenches. A wall 105 is present between the trenches. Stress compensation elements 120 are arranged between the unit trench capacitors 110 such that they interrupt the elongated walls formed by walls 103 between adjacent unit cells. The stress compensation element 120a comprises a trench in a wall between adjacent unit trench capacitors 110 passing two intersections of common unit cell walls. The stress compensation element 120b comprises a trench in a wall between adjacent unit trench capacitor cells passing one intersection of common unit cell walls.

The previous exemplary embodiments illustrate the presence of elongated walls which are interrupted by stress compensation elements. This solution can, however, also be inverted. Instead of a rigid elongated wall, that is running across the entire wafer, also a rigid elongated trench might be possible. Such embodiment can be derived, if a unit trench capacitors do not have a wall at the outer borders, but a trench. In that case instead of elongated walls, elongated trenches are present between the unit trench capacitors. Also in in such an elongated rigid trench stress will build up when the trench is filled with filling material such as a conductive material. In order to avoid the wafer bow caused by elongated trenches filled with the filling material, mechanical stress compensation elements are provided. These stress compensation elements interrupt the elongated trenches. In embodiments of the present invention the stress compensation elements can deform and as a result thereof the stress along the trench (or wall in other embodiments) relaxes. They may for example be hills or islands interrupting the elongated trenches. Also in this case the stress compensation elements may be capacitors connect in parallel with the unit trench capacitors and contributing to the overall capacitance.

Figure 8:
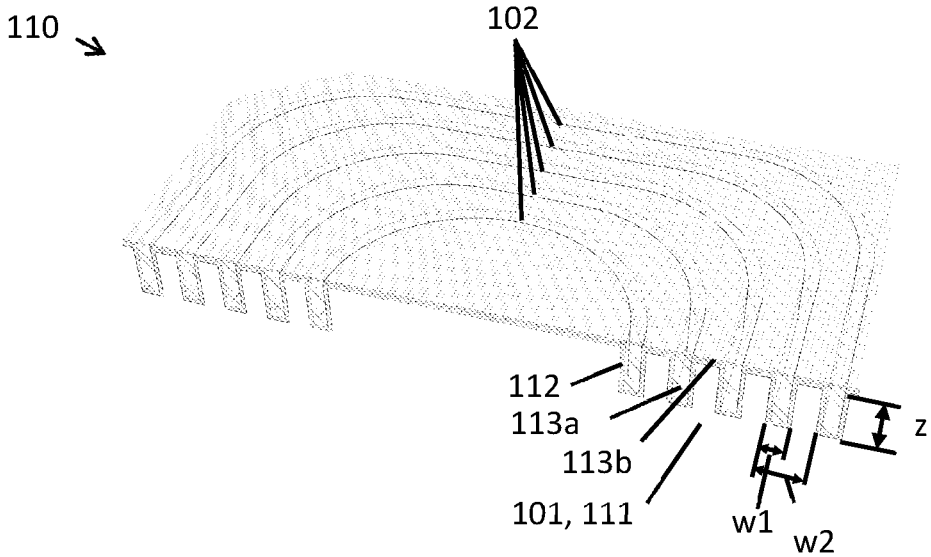
FIG. 8 shows a 3D-drawing of a part of a unit trench capacitor which could be used in a trench capacitor in accordance with embodiments of the present invention.
Figure 9:
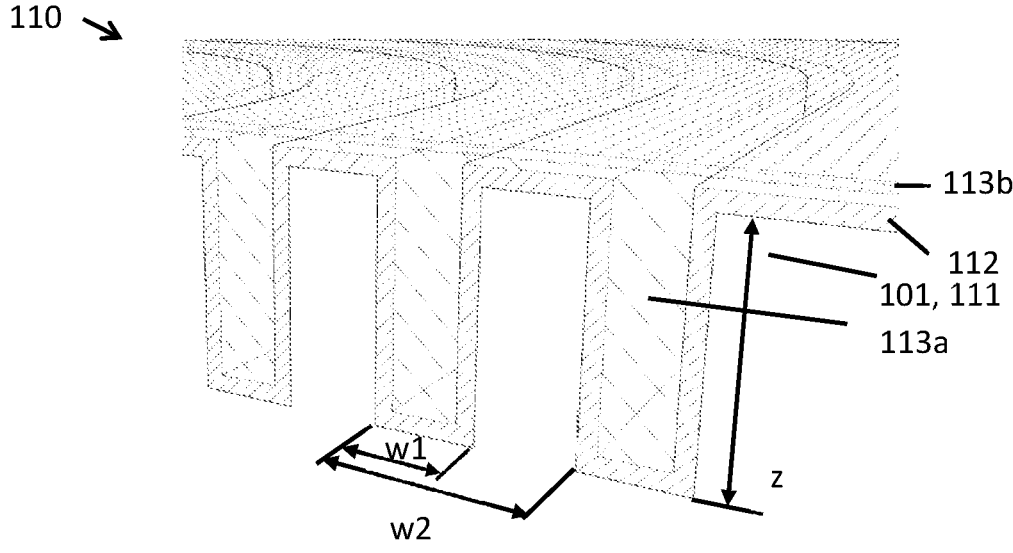
FIG. 9 shows a graph which zooms in into three trenches of FIG. 8.

FIG. 8 shows a 3D-drawing of a part of a unit trench capacitor 110 which could be used in a trench capacitor 100 in accordance with embodiments of the present invention. Only half of the unit trench capacitor is shown. FIG. 9 shows a graph which zooms in into three trenches of FIG. 8. In embodiments of the present invention the substrate 101 may serve as bottom electrode 111 of the trench capacitors. In that case the substrate 101 as well as the trenches 102 in the substrate are covered with a dielectric layer 112 as for instance SiO2 or Si3N4 or any other dielectric or a combination of dielectrics. On top of the dielectric 112 a conducting layer 113a as for instance poly-silicon or Aluminum as metal or any other conducting layer or combinations of conducting layers 113a, 113b are deposited forming the top electrode 113 of the trench capacitor. In a preferred embodiment the substrate 101 may for example be a silicon substrate.

In embodiments of the present invention a depth z of the one or more trenches of the unit trench capacitors 110 and/or of the stress compensation elements 120 is between 5 and 100 μm.

In embodiments of the present invention a width w1 of the one or more trenches of the unit trench capacitors 110 and/or of the stress compensation elements 120 is between 1 and 10 μm.

In embodiments of the present invention a pitch w2 between neighboring trenches is between 2 and 20 μm.

Figure 10:
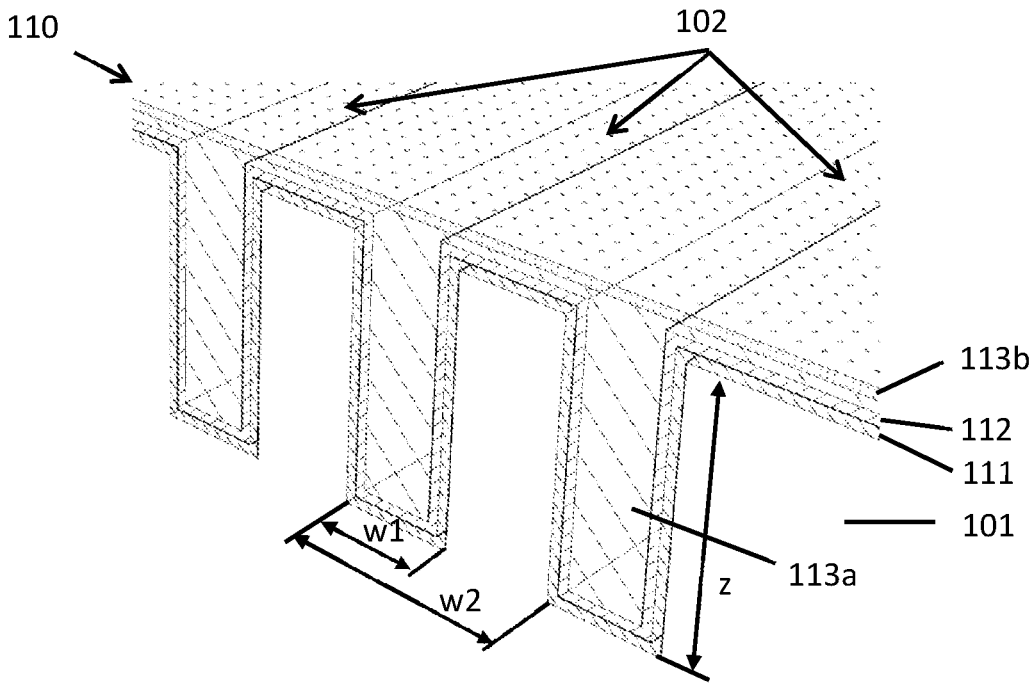
FIG. 10 shows a 3D schematic drawing of trenches of a unit trench capacitor in a non-conducting substrate, wherein the unit trench capacitor could be used in a trench capacitor in accordance with embodiments of the present invention.

An inversion of layers is also possible. This is illustrated in the 3d-graph of FIG. 10. In that case the substrate 101 may be a non-conducting or dielectric material as for instance glass or quartz. In the substrate 101 trenches 102 are provided. The substrate including the trenches is covered with a conducting material or a combination of conducting materials as mentioned above. This will form the bottom electrode 111 of the trench capacitor. On top of this conducting layer or layer stack, a dielectric layer or layer stack will be arranged forming the dielectric 112 of the trench capacitor. Further on top of this dielectric 112, again a conducting layer or layer stack is placed forming the top electrode 113a, 113b.

Looking to a unit trench capacitor 110, each trench 102 is characterized in having side walls. If the unit trench capacitor 110 comprises a plurality of trenches 102, each trench is further characterized in having neighboring trenches and sidewalls. This is also true, if unit trench capacitors 110 are grouped together in order to form a trench capacitor 100.

In embodiments of the present invention the pitch of the trenches in the unit trench capacitor 110 and also when grouping the unit trench capacitors 110 together to a trench capacitor 100, is always the same, so that at least in a partial area, and specific in the area where trenches are not rounded, there is a homogeneous distribution of stress.

In rounded regions, e.g. at the corners of the unit trench capacitor 110 of FIG. 3 or in areas between the round unit trench capacitors of FIG. 4, the density of trenches is lower than in the elongated area and therefore the stress is also lower.

In order to reduce the stress in these areas, mechanical stress compensation elements 120 are introduced.

In embodiments of the present invention where the stress compensation elements are capacitors, they processed in the same way as the unit trench capacitors. In embodiments of the present invention they also may have the same layer stack and they may be electrically connected in parallel with the unit trench capacitors.

By doing so two advantages are obtained. The mechanical stress (e.g. in the regions, that are not covered by trenches of the unit trench capacitors) is distributed, and additionally these mechanical stress compensation elements are electrically active, thus contributing to the total electric capacitance of the trench capacitor suitable for RC-Snubber devices. This leads to a higher capacitance per area, what may lead to smaller devices.

Figure 11:
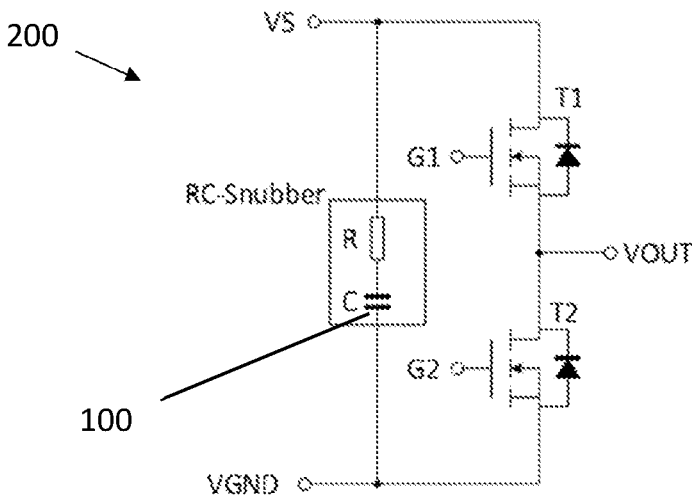
FIG. 11 shows an electric scheme of an RC-snubber in accordance with embodiments of the present invention.

In a second aspect embodiments of the present invention relate to an RC-snubber device comprising a trench capacitor in accordance with embodiments of the present invention. A schematic drawing of such a device is shown in FIG. 11. The RC-snubber device 200 comprising an RC circuit, comprising a trench capacitor 100 in series with a resistor, connected in parallel with a series connection of transistors T1 and T2, in accordance with embodiments of the present invention. In embodiments of the present invention the resistor may be an integral part of the unit trench capacitor and therefore the trench capacitor. The resistance value can be derived by adjusting the conductivity of the top electrode (e.g. the doping of the Poly Si) and the bottom electrode (e.g. the doping of the substrate) or by design (e.g. the dimensions of the unit trench capacitors). This offers the advantage, that no external resistor must be provided. By doing so, the resistor is an integral part of the unit trench capacitor and thus the trench capacitor and connected in series to the unit trench capacitor and trench capacitor.

The snubber structure is connected directly to the power rails and suppresses transients caused by switching of the switching transistors T1 and T2. The trench capacitor comprises a plurality of unit trench capacitors and stress compensation elements. The unit trench capacitors and the stress compensation elements are arranged for a reduced wafer bow during the fabrication process. This also improves the reliability of the device as also the chip with unit trench capacitors and stress compensation elements, in accordance with embodiments of the present invention, will have less overall stress.

In embodiments of the present invention the stress compensation elements of the RC-snubber device are also capacitors contributing to the total capacitance value of the trench capacitor.

Figure 12:
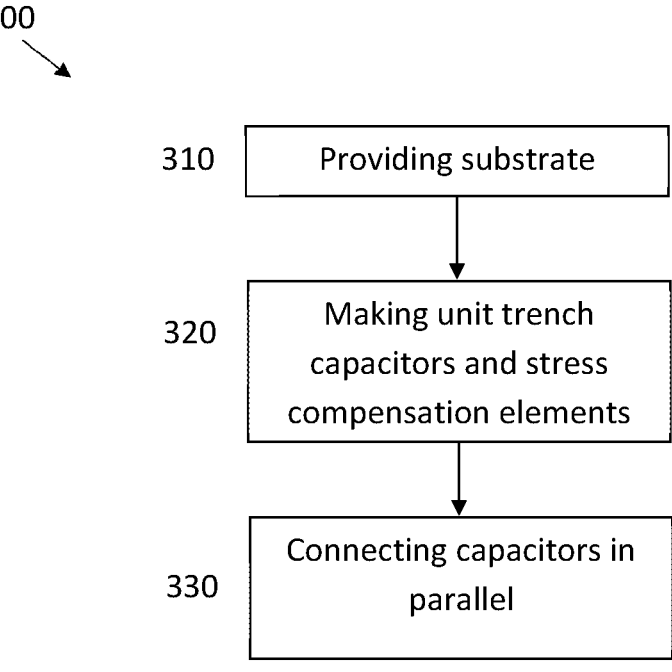
FIG. 12 shows a flow chart of an exemplary method in accordance with embodiments of the present invention.

In a third aspect embodiments of the present invention relate to a method 300 for making a trench capacitor 100. A flow chart of an exemplary method 300 in accordance with embodiments of the present invention is shown in FIG. 12. The method comprises:

Providing 310 a substrate.

Making 320 a plurality of unit trench capacitors 110. The unit trench capacitors are made by making one or more closed trenches, wherein each trench comprises a bottom electrode 111, a top electrode 113, and a dielectric 112 between the bottom electrode 111 and the top electrode 113. Making the trenches may for example be achieved by Deep Reactive Ion Etching (DRIE) as that will result in trenches that have vertical walls. Preferably the walls are substantially vertical such that they can be properly filled. The DRIE may for example be applied in a silicon substrate. Low Pressure Chemical Vapour Deposition techniques (LPCVD) or Plasma Enhanced Chemical Vapour deposition techniques (PECVD) or atomic layer deposition (ALD) may be used for providing layers such as an electrode layer or dielectric. The unit trench capacitors are made such that they are arranged in a 2D repetitive pattern in the substrate. As a result thereof the unit trench capacitors 110 are separated by elongated trenches or elongated walls between the unit trench capacitors. The method further comprises making 320 stress compensation elements 120 between the unit trench capacitors 110 such that they interrupt the elongated walls or trenches.

Connecting 330 the unit trench capacitors 110 in parallel. Additionally the stress compensation elements may be capacitive elements connected in parallel with the unit trench capacitors.

The invention claimed is:

1. A trench capacitor comprising a plurality of unit trench capacitors arranged in a 2D repetitive pattern in a substrate such that the unit trench capacitors are separated by elongated trenches or elongated walls between the unit trench capacitors, and comprising a plurality of stress compensation elements, wherein each unit trench capacitor comprises one or more trenches with a closed circumference, each trench further comprising a bottom electrode, a top electrode, and a dielectric between the bottom electrode and the top electrode, wherein the unit trench capacitors are connected in parallel, and wherein the stress compensation elements are trench capacitors comprising a trench with a closed circumference and are arranged between the unit trench capacitors on crossings of the elongated walls or elongated trenches, and wherein the stress compensation trench capacitors have, in a plane parallel to a surface of the substrate, a smaller enclosed area than the unit trench capacitors.

2. The trench capacitor according to claim 1, wherein each stress compensation element is a trench capacitor connected in parallel with the unit trench capacitors.

3. The trench capacitor according to claim 1, wherein the unit trench capacitors are separated by elongated walls, wherein the stress compensation elements are connected in parallel with the unit trench capacitors, and wherein the trenches of the stress compensation elements are substantially in the middle of the elongated walls.

4. The trench capacitor according to claim 1, wherein at least some of the unit trench capacitors comprise two or more trenches with a closed circumference which are arranged concentrically.

5. The trench capacitor according to claim 1, wherein the one or more trenches, with a closed circumference, of the unit trench capacitors have rounded corners.

6. The trench capacitor according to claim 5, wherein the rounded corners have a same radius.

7. The trench capacitor according to claim 1, wherein the unit trench capacitors comprise at least two trenches with a closed circumference which are similar.

8. The trench capacitor according to claim 1, wherein a depth of the one or more trenches of the unit trench capacitors and/or of the stress compensation elements is between 5 and 100 μm.

9. The trench capacitor according to claim 1, wherein a width of the one or more trenches of the unit trench capacitors and/or of the stress compensation elements is between 1 and 10 μm.

10. The trench capacitor according to claim 1, the unit trench capacitors comprising at least two trenches, wherein a pitch between neighboring trenches is between 2 and 20 μm.

11. The trench capacitor according to claim 1, wherein the trenches, with a closed circumference, of the unit trench capacitors have a square or rectangle or rhomboid, or hexagonal, or circular, or ellipsoidal shape.

12. An RC-snubber device to suppress transients in an electrical system, the RC-snubber device comprising a resistor connected in series with the trench capacitor according to claim 1.

13. A method for making a trench capacitor, the method comprising:

providing a substrate, making a plurality of unit trench capacitors, wherein each unit trench capacitor comprises one or more trenches with a closed circumference, each trench further comprising a bottom electrode, a top electrode, and a dielectric between the bottom electrode and the top electrode, and wherein the unit trench capacitors are arranged in a 2D repetitive pattern in the substrate such that the unit trench capacitors are separated by elongated trenches or elongated walls between the unit trench capacitors, and making stress compensation elements between the unit trench capacitors such that they are trench capacitors comprising a trench with a closed circumference and such that they are on crossings of the elongated walls or elongated trenches, and such that the stress compensation trench capacitors have, in a plane parallel to a surface of the substrate, a smaller enclosed area than the unit trench capacitors, and connecting the unit trench capacitors in parallel.

\* \* \* \* \*